United States Patent [19]

Mayne et al.

[11] 3,803,555

[45] Apr. 9, 1974

[54] INPUT DATA PREPARATION SYSTEM

[75] Inventors: David W. Mayne, San Juan Capistrano; Alan K. Jennings, Anaheim, both of Calif.

[73] Assignee: Peripheral Business Equipment, Inc., El Segundo, Calif.

[22] Filed: Feb. 16, 1971

[21] Appl. No.: 115,309

[52] U.S. Cl. .............. 340/172.5

[51] Int. Cl. ......... G06f 3/00, G06f 3/06, G06f 3/10

[58] Field of Search .......... 340/172.5; 235/61.6, 92; 234/13, 14, 15, 55, 123

[56] References Cited

UNITED STATES PATENTS

| | | | |
|---|---|---|---|
| 3,602,894 | 8/1971 | Igel et al. | 340/172.5 |
| 3,602,897 | 8/1971 | Igel et al. | 340/172.5 |
| 3,241,120 | 3/1966 | Amdahl | 340/172.5 |
| 3,447,134 | 5/1969 | Thompson et al. | 340/172.5 |
| 3,248,705 | 4/1966 | Dammann et al. | 340/172.5 |
| 3,623,001 | 11/1971 | Kleist et al. | 340/172.5 |
| 3,633,177 | 1/1972 | Caldwell | 340/172.5 |
| 3,636,521 | 1/1972 | Wallace et al. | 340/172.5 |
| 3,657,706 | 4/1972 | Horgan et al. | 340/172.5 |
| 3,602,902 | 8/1971 | Madden | 340/172.5 |
| 3,495,222 | 2/1970 | Perotto et al. | 340/172.5 |
| 3,222,648 | 12/1965 | Bell et al. | 340/172.5 |
| 3,548,160 | 12/1970 | Welsh | 235/61.6 R |

*Primary Examiner*—Gareth D. Shaw
*Assistant Examiner*—Jan E. Rhoads
*Attorney, Agent, or Firm*—Fraser and Bogucki

[57] ABSTRACT

An input data preparation system includes key inputs, a display, a multi-character position memory, a magnetic tape unit and control logic for recording, transmitting and verifying blocks of data. The system transfers data from key to memory and bidirectionally between memory and a magnetic tape unit and between memory and a data transfer channel. The data transfer channel may connect with any suitable system such as a data transmission system or pooling circuit arrangement. The use of a command bit associated with each memory position permits special operating functions including station identification, data editing, file explosion, end stripping, internal stripping and early release.

25 Claims, 4 Drawing Figures

INVENTORS
DAVID W. MAYNE
ALAN K. JENNINGS

BY Fraser and Bogucki
ATTORNEYS

INVENTORS
DAVID W. MAYNE
ALAN K. JENNINGS
BY
Fraser and Bogucki
ATTORNEYS

INVENTORS
DAVID W. MAYNE
ALAN K. JENNINGS
BY
Fraser and Bogucki
ATTORNEYS

INPUT DATA PREPARATION SYSTEM

BACKGROUND OF THE INVENTION

1. Field of the Invention

This invention relates to input data preparation systems and more particularly to key input systems having a buffer memory.

2. History of the Prior Art

Presently known input data preparation systems such as model 4301 manufactured by Peripheral Business Equipment, Inc. and such as is described in a copending patent application "Input Data Preparation System," Kleist et al., Ser. No. 951, filed Jan. 6, 1970, now U.S. Pat. No. 3,623,001, and assigned to the assignee of this invention perform a wide variety of functions.

Such systems generally include an addressable memory having a plurality of character positions for storing a block of data. Associated with each character position are a plurality of data bits for storing one data character, a plurality of program bits for storing at least one program character and at least one flag or command bit. In one arrangement, each character position includes six data bits, two groups of three program bits and one "flag" bit. A switch determines which of the two programs is used at a given time, if either.

Each character position can be programmed to indicate letter fields, number fields, skip fields, dup fields, release fields and left zero fields. Upon accessing a character position, a system response with respect to the processing of information is produced which is dependent upon the program character stored therein, the mode of operation and the status of control switches. For instance, the system will rapidly pass over a skip field when entering data and verifying, simultaneously changing the stored data content to become space codes if the automatic skip/dup switch is on. A skip program code is ignored when wriing on tape or outputting to a data transfer channel. A dup field is rapidly passed over, but without changing the data content, only after the first record when entering data and verifying and is not passed over at all when writing on tape or outputting to a data transfer channel. Number and letter program fields automatically shift the keyboard to the proper position and produce an error signal when the wrong type of character is entered. A release code causes termination of a record.

When connected into a pooling circuit and provided with a magnetic tape recorder such a system can operate in a variety of modes. These include Read Program Tape, which causes the system either to search for a selected program stored on magnetic tape or received from the data transfer channel; Enter Program, which allows a program to be entered into a memory from the keyboard; Enter Data, which permits data to be keyed into the memory and then output on magnetic tape or over the data transfer channel; Verify Data, in which data on tape is transferred to memory and compared with keyboard data; Merge Tape, in which information is transferred from the tape recorder to memory and then output on the data transfer channel; Search Data, in which the system searches blocks of data on magnetic tape for selected identifier numbers; Send, in which data is transferred from the tape recorder to memory and then output on the data transfer channel to a data communications channel such as a telephone line; Receive, in which data is received in memory from the data transfer channel after being transferred over a data communications channel and then written on tape; and Central Recorder, in which data from other units in the pooling circuit is received on the data transfer channel, placed in memory and then written on tape.

SUMMARY OF THE INVENTION

An input data preparation system operates on blocks of data and includes a keyboard, a display panel, a data transfer channel, control circuits and an addressable memory. In one particular system the memory is divided into 200 addressable character positions with 13 bits associated with each position. Of the 13 bits six store a single data character, three store a first program code, three store a second program code and one stores a flag or command signal. This invention provides control circuit modifications which operate in conjunction with the flag bit to provide special functions which improve the data processing capabilities of the system with minimum cost.

Included among these special functions is station identification which provides an automatic dup override, causing a field to be treated as a dup field whether or not the automatic skip/dup control switch is on. This enables a key station identifier code to be placed in memory and then transferred to tape. The function can also be used for dates, job numbers or any other information to be repeated on every record.

An early release function permits the use of variable length truncated records. A record can be terminated by depressing an early release key without filling the remainder of the data block with space codes. This function saves processing time, magnetic tape storage space and data communications time.

Still another feature according to the invention is the ability to edit a block of information by changing data already present or by inserting or deleting data in a record. This feature applies to the merge tape, send, receive and central recorder modes.

Another feature, delete after first record, permits information common to a group of records to be sent only with the first record as the records are sent over a data communications line. Thereafter the sending unit skips the constant data and the receiving unit automatically inserts it.

Additionally, an end stripping feature permits unwanted data at the end of a previously formed record to be stripped off, thereby shortening the record to save processing time, magnetic tape storage space and data communications time.

A file explosion feature permits records having only selected data characters, such as a given job number or other selected information to be transferred from magnetic tape to either the data communications channel or a central recorder.

BRIEF DESCRIPTION OF THE DRAWINGS

A better understanding of the invention may be had from a consideration of the following detailed description, taken in conjunction with the accompanying drawings, in which.

DETAILED DESCRIPTION

Figure 1:
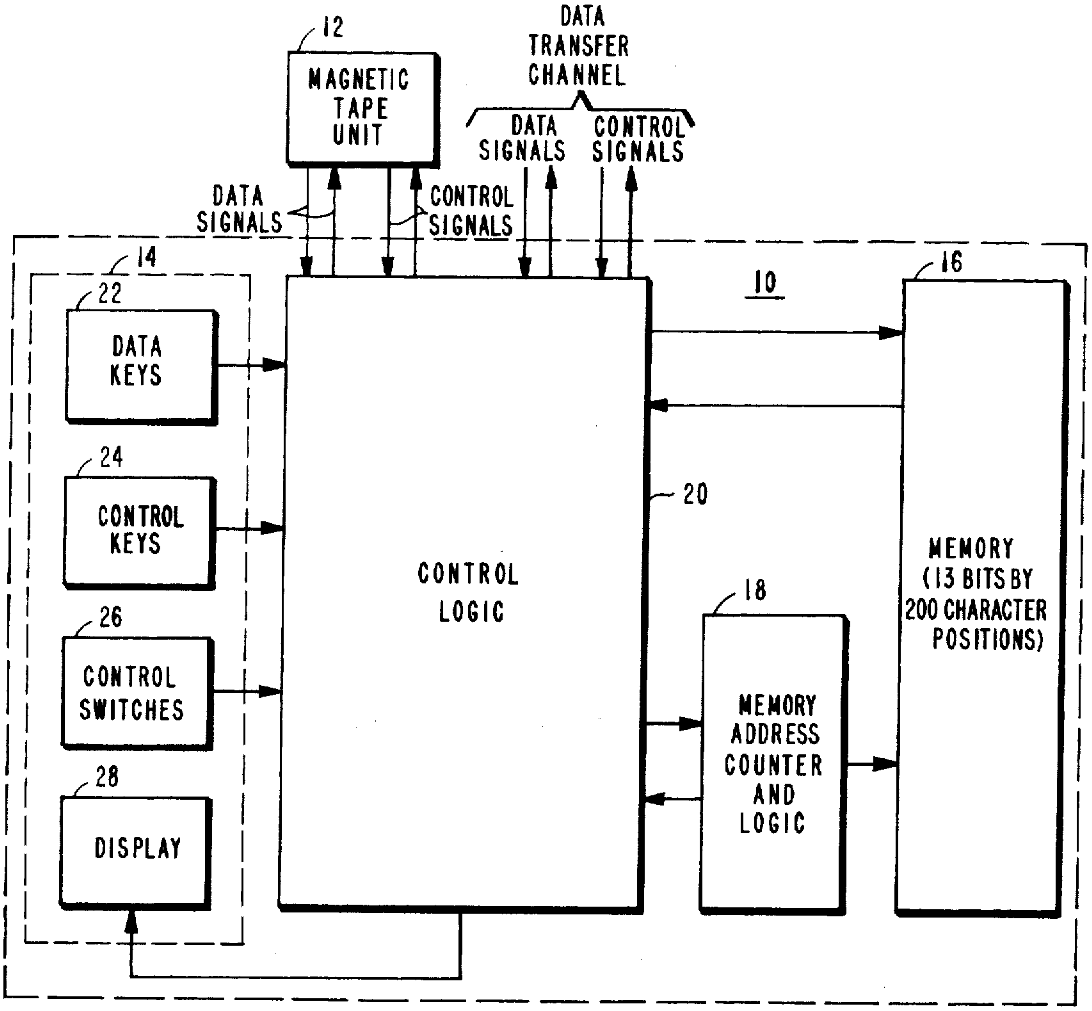
FIG. 1 is a block diagram of one preferred form of an input data preparation system in accordance with the invention.

In accordance with the invention there is shown in FIG. 1 an input data preparation system 10 connected with a magnetic tape unit 12, which in other applications might be replaced by a card puncher and reader, magnetic disk file or other data storage device. A data transfer channel provides bidirectional communication with a pooling circuit, data communications channel or other device for receiving and sending information. The system operates on blocks of data or data records which in this example have a maximum length of 200 characters.

The input data preparation system 10 includes a control panel 14, an addressable memory 16, and memory address counter and logic 18 connected by control logic 20. The control panel 14 includes data keys 22, control keys 24, control switches 26 and a display 28. The data keys 22 produce all of the letters, numbers and other characters which are stored in the data portion of the memory 16. The control keys 24 provide the control and command signals which utilize a short pulse as opposed to a continuous signal. The control keys include backspace, space, release, reset, skip, dup, and left zero. The control switches 26 provide the command or control signals which require a continuous signal and include mode selection, program selection and selective verify/release. Operator feedback is provided by the display 28 which indicates memory position being addressed, program selected, program and data characters stored in the addressed position and errors.

The memory 16 may be any suitable electrically alterable memory but a semi-conductor memory is assumed for this preferred embodiment. It has 200 addressable character positions with each position having 13 bits of storage. Of the 13 bits, six are used to store a data character, three are used to store a first program code, three are used to store a second program code and one is the flag or command bit. A program selection switch permits an operator to select either the first program, the second program or neither. Eight program codes are available and indicate dup, skip, left zero justify, number, letter, number start, letter start, and release.

As in presently known systems, the flag bit is used in conjunction with manual dup commands, but it is also used to provide special features in accordance with the invention herein. It should be understood, however, that one or more separate memory bits could be provided for any or all of the special features. But it is more economical to use a single bit to provide several functions as long as each of the functions is mutually exclusive so that there can be no ambiguity as to the meaning of a signal stored in the flag or command bit. The flag bit is presently used in the data verify mode in conjunction with manual or programmed dup commands. If the remainder of a field is the same as was contained in a previous record, an operator can depress the dup key and the previous record will be automatically duplicated to the beginning of the next field. The flag bit is used to distinguish a possible erroneous depression of the dup key. As data is placed in the memory from tape in the verify data mode the flag bit is set whenever the data character stored in a given position changes. Thus, when an operator depresses the dup key if the system encounters no set flag bits before the end of the field, the previous two records were identical and the system assumes constant data in these positions and permits the manual dup. On the other hand, if a set flag is encountered in a character position prior to the end of the field, an error indication is given.

The memory address counter and logic 18 sequentially addresses the memory 16 and is incremented, decremented and reset by commands from control logic 20. Current address locations are provided to the control logic 20.

The control logic 20 receives the various control and data signals and produces predetermined proper system responses in accordance the status thereof.

A data transfer channel provides bidirectional communication with external systems. In this example, it is assumed that either a pooling circuit or a data communications channel can be selected. However, in general the data transfer channel can be connected to any suitable data processing system.

Figure 2C:
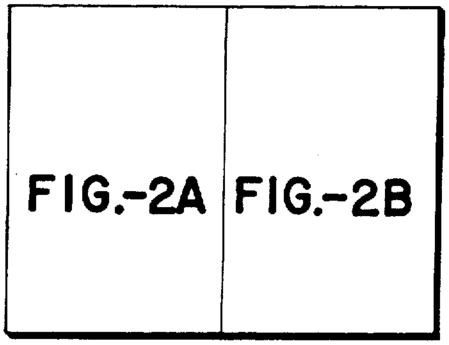
FIGS. 2A–2C are a partial schematic and partial block diagram of a control portion of the system shown in FIG. 1.
Figure 2A:
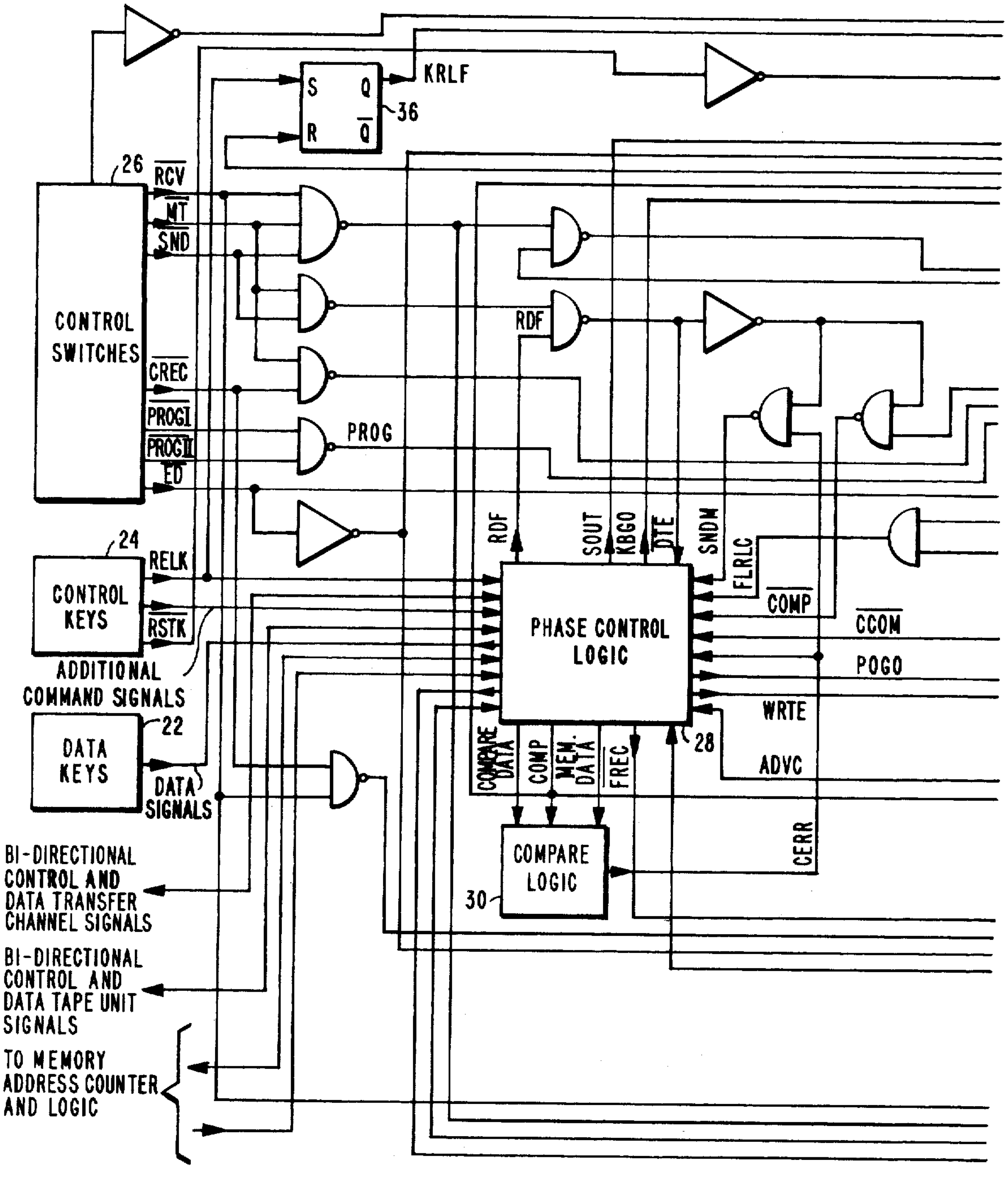
Figure 2B:
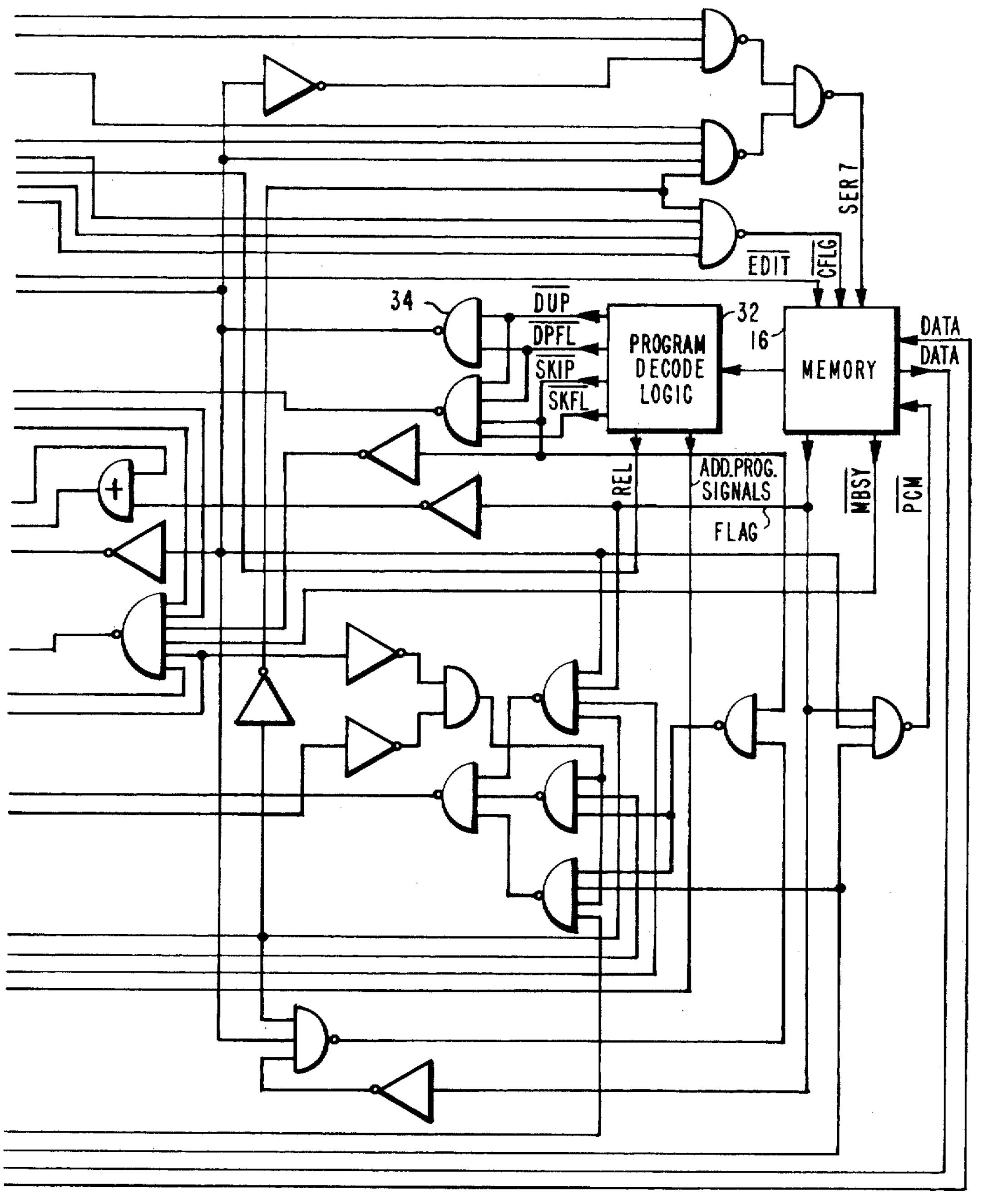

Portions of the control logic 20 are shown in greater detail in FIG. 2. Phase control logic 28 provides the necessary sequencing and control functions for the system 10 in a conventional manner. Operations are carried out by programs and program subroutines in response to command and control signals.

Compare logic 30 compares memory data with compare data, which may be data received from the data keys 22, the tape unit 12 or the data transfer channel. The comparison is made upon receipt of a compare command (COMP) from phase control logic 28 and a compare error signal (cerr) is produced whenever the two sets of data differ.

Program decode logic 22 receives the selected program bits and produces signals indicating the status of program fields at addressed locations. The DUP signal becomes true whenever a character position storing a DUP program code is addressed. The DPFL signal goes true upon passing the first DUP program code of a dup field and remains true until reset by the start of a new field. Because only the first and last character positions of a dup field contain DUP codes, with intermediate positions storing NUMBER or LETTER codes, it is necessary to OR these two signals in NAND gate 34 to produce a signal which always goes true when a dup field character position is addressed. Similarly, SKIP and SKFL signals indicate a SKIP program code and presence within a skip field respectively. A signal REL indicates the presence of a RELEASE code and additional program signals are communicated to the phase control logic 28.

A signal, $$SER7 = (SEL\ VER/REL)\cdot KRLF\cdot \overline{(DUP+DPFL)} + SOUT\cdot FREC\cdot RSTK\cdot (DUP+DPFL) \qquad (1)$$

sets the flag bit in addressed memory locations to implement the special features provided in accordance with this invention. The first portion of equation (1) implements the early release feature by setting the flag bit in all non-dup field character positions when the Release key is depressed while the Automatic Skip/Dup — Selective Verify/Release control switch is in the Selective Verify/Release position. Depression of the Release key sets flip flop 36 to hold the KRLF signal true while the system automatically accesses the remaining character positions of a normal length record block, setting all flags and storing space codes in the data bits. As the memory contents are output to tape, the record is terminated at the first character position having a flag bit in a non-dup field, thereby providing a shortened record.

The second portion of equation (1) implements the edit and station identification features by setting the flag bit in an addressed character position within a dup field. The flag bit is set by depressing the Reset key and a data key simultaneously. The SOUT signal of equation (1) is a clock signal used to transfer information into or out of the memory 16 and the signal FREC indicates that a first record has not yet been completed after switching to a new mode.

The flag bits are reset or cleared by a signal, $$CFLG = FREC\cdot KBGO\cdot\overline{COMP}\cdot ED \quad (2)$$

as the character positions are sequentially addressed during the first record after switching to the enter data mode. ED indicates the positioning of a mode selecting one of the control switches 26 to the enter data mode. KBGO is a keyboard enable signal and COMP is the compare command signal which causes compare logic 30 to compare the contents of memory with another signal. During the first record the desired flag bits must again be set as described above because they are automatically cleared as each position is addressed.

The station identification feature is initiated by programming dup fields at the constant data positions and then setting the flag bits in these fields during the first record while in the enter data mode. Thereafter the information stored in the flagged dup fields is automatically entered into each record. This feature is implemented by a logic signal which automatically advances the address counter.

A signal, $$ADVC = ADVC1+ADVC2+ADVC3 \text{ where,} \quad (3)$$

$$ADVC1 = (DUP+DPFL)\cdot\overline{FREC}\cdot ED\cdot FLAG \quad (4)$$

$$ADVC2 = (CREC+RCV)\cdot\overline{WRTE}\cdot\overline{COMP}\cdot[SKIP+\overline{FREC}\cdot(DUP+DPFL)\cdot\overline{FLAG}] \quad (5)$$

$$ADVC3 = (RCV+MT+SND)\cdot\overline{RCV}\cdot(WRTE+COMP)\cdot[SKIP+FREC\cdot(DUP+DPFL)\cdot\overline{FLAG}] \quad (6)$$

is connected to the phase control logic 28 and advances the address counter with the ADVC1 portion of the logical equation defining the station identification circumstances. The signals ED, CREC, RCV, MT and SND indicate the setting of the mode control switch to the enter data, central recorder, receive, merge tape or send mode, respectively. WRTE indicates that the system is in a sequence of operations wherein information is written from memory onto tape. The ADVC signal causes the counter to be automatically advanced whenever a flagged dup field is encountered in the enter data mode after the first record whether or not the automatic SKIP/DUP switch is on. Thus, as the operator keys in data, the system automatically passes over the flagged dup fields without changing the data so that the same information is always written on tape.

The early release feature permits the system to transfer a shortened record out of memory. Rather than transfer useless information at the end of a standard sized record block, a shortened record is provided for. As previously explained in conjunction with FIG. 1, depression of the release key while in the enter data mode causes flags to be set in all subsequent non-dup field character positions until the normal end of record position is reached as indicated by a release code. Then, as information is transferred out of the memory the record is terminated at the first character position storing a flag signal in a non-dup field. A FLAG release command signal, $$FLRLC = (\overline{DUP+DPEL})\cdot ED\cdot FLAG \quad (7)$$

is provided to the phase control logic 28 and causes termination of a record whenever a flag signal is found in a non-dup field during the data enter mode.

An edit feature permits information changes in a previously assembled block of data while sending or receiving information over a communication line or while merging information stored in the tape unit 12 with other information being sent to a central recorder. The selected character positions which are to be edited are programmed as dup fields and as the new information is keyed into the memory the flag bits for those positions are set in accordance with equation (1). Two signals are provided to the memory 16 to prevent erasure of the flag signals and to prevent change of the data signals stored in the selected positions.

A signal, $$EDIT = (DUP+DPFL)\cdot(RCV+MT+SND) \quad (8)$$

prevents erasure of the flag signal by the CFLG signal (equation 2) during the first record and a signal, $$PCM = (DUP+DPFL)\cdot(RCV+MT+SND)\cdot FLAG \quad (9)$$

prevents changes in the data stored in the selected memory positions as information is transferred into the memory from the tape unit 12 or the data transfer channel. Then, when the information block is transferred out of the memory 16 the new information is contained therein.

When operating in a central recorder mode, that is when receiving information over the data transfer channel from a pooling circuit and recording the information on tape a somewhat different editing feature is provided. This feature is utilized by storing information to be added to record blocks in a skip field immediately subsequent to the normal length record block positions. The record blocks which are received must all be of a predetermined length and there must be no skip or dup fields prior to the new information skip field. As information is transferred into the memory the address counter is advanced through the skip field in accordance with equation (3) and the entire block of data is written on tape in a conventional manner.

A delete after first record feature permits constant data being sent over the data transfer channel to be sent only with the first record. Thereafter the sending unit automatically skips the constant data and the receiving unit automatically inserts it. The constant data positions are programmed as non-flagged dup fields in both the receiving and sending units and they then automatically advance the memory address counter past these positions in accordance with equation (3) after the first record.

An end stripping feature permits unwanted data to be stripped off the end of blocks of information by providing the phase control logic 28 with a count complete signal which simulates a signal that is conventionally provided as the memory address counter 18 reaches the end of a standard length record block. This signal is implemented as, $$CCOM = SKIP \cdot (CREC+MT) \cdot \overline{MBSY} \cdot WRTE \cdot POGO \cdot PROG \quad (10)$$

where SKIP is a signal indicating a skip program code, MBSY is a signal indicating the memory is busy processing data, WRTE is a signal indicating that the system is in a phase of operation wherein information is transferred out of the memory 16, and POGO is a signal indicating that the system is in operative communication with a pooling circuit. The PROG signal indicates that one of the two programs has been selected with the program selector switch.

A file explosion feature permits only selected records stored in the tape unit to be output on the data transfer channel in a merge tape or send mode of operation. Conventionally blocks of data can be identified only by data block identifier numbers but this file explosion technique permits selection according to information stored within a data block. For instance, assume that a reel of tape in the tape unit 12 stores a variety of data blocks but only those relating to a certain account are desired. In accordance with this feature the account identifier numbers are placed in the appropriate character positions which are programmed as either skip or non-flagged dup fields. Then, as blocks of data are transferred from the tape unit 26 to memory only those records having matching data in the selected positions are transferred out over the data transfer channel. In addition, if a skip field is used as the identifier field the end stripping feature becomes operative as described in conjunction with equation (10) above. Therefore a skip identifier field can be used only at the end of a block of data.

The file explosion feature is implemented by several signals. A disable tape error signal, $$DTE = (MT+SND) \cdot RDF \quad (11)$$

is provided to the phase control logic 28 to disable the tape error signal which is produced by the compare logic 30 when the compared character positions do not match. The RDF signal is produced by the phase control logic 28 and indicates that the system is in a phase of operation wherein information is being transferred into the memory 16.

A compare signal, $$COMP = (MT+SND) \cdot RDF \cdot (DUP+DPFL+SKFLD) \quad (12)$$

is provided to the phase control logic 28 which then provides the COMP signal to the compare logic 30, causing it to compare the two sets of data and produce a compare error signal, CERR, if they do not match. The SKFLD signal indicates that the most recently addressed character position is within a skip field.

A signal, $$SENDM = (MT+SND) \cdot RDF \cdot CERR \quad (13)$$

permits data to be sent out over the data transfer channel by inhibiting transfer unless there is a match as indicated by the CERR term being false.

The derivation of signals shown in this disclosure can be found in greater detail by reviewing a published Technical Manual for the Peripheral Business Systems 4301 Magnetic Data Recorder with Pooling Option, PBE 110030, Revision 08, 3 Nov. 1970.

In particular, the RDF signal, which is a Read Function signal indicating that information is being transferred into the memory 16, is shown as being generated at location 6-7 D on sheet 1 of Drawing No. 120037-10 entitled "Schematic PCBA Control Logic 1P/1C/1H" from the Technical Manual.

SOUT is a Service Out signal which is used as a clock signal. Its manner of generation is shown at zone 2A-B in sheet 1 of Drawing No. 120038-10 entitled "Schematic, PCBA Control Logic 2P" from the Technical Manual.

A Keyboard Go signal, KBGO enables the keyboard and has its origin shown at zone 2B of sheet 2 of Drawing No. 120037-10, entitled "Schematic PCBA Control Logic 1P/1C/1H" from the Technical Manual.

POGO is a Pooler Go signal indicating communication with a pooling circuit. The manner in which it is generated is shown at zone 2B of sheet 2 of Drawing No. 120037-10, entitled "Schematic PCBA Control Logic 1P/1C/1H" from the Technical Manual.

WRTE, the Write Function signal, indicates that information is being transferred out of memory and, in most instances, written onto tape. The logic for generating this signal is shown at zone 7B of sheet 2 of Drawing No. 120038-10 entitled "Schematic, PCBA Control Logic, 2P" and zone 2C of Drawing No. 120037-10 entitled "Schematic PCBA Control Logic 1P/1C/1H" from the Technical Manual.

FREC is a First Record signal indicating that the first record is still being entered. Circuitry for generating this signal is illustrated at zone 3B of sheet 1 of Drawing No. 120037-10, entitled "Schematic PCBA Control Logic 1P/1C/1H" from the Technical Manual.

DATA is a signal representing data taken from the memory 16 as indicated by points A, B, C, D, E and F of zone C of sheet 1 of Drawing No. 120064-1, entitled "Schematic PCBA Register, 1P" from the Technical Manual.

COMP, the signal which commands compare logic 30 to compare memory data with compare data is generated at zone 2-3D of sheet 1 of Drawing No. 120037-10, entitled "Schematic PCBA Control Logic 1P/1C/1H" from the Technical Manual.

COMPARE DATA, which may be generated by data keys 22, the tape unit 12 or the data transfer channel enters the system on BUSO-BUS5 at zone 8D of sheet 1 of Drawing No. 120064-02, entitled "Schematic PCBA Register, 1P" from the Technical Manual.

A conventional counter which generates the Memory Address signals is illustrated on sheet 2 of Drawing No.

120064-2, entitled "Schematic PCBA Register, 1P" from the Technical Manual. Sheets 1-4 of Drawing No. 120000-11 illustrate the conventional core memory 16 and memory address logic 18 used in the system 10. The various locations in memory are sequentially addressed by incrementing or decrementing the counter.

Although there has been described above a specific arrangement of an input data preparation system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. In an input data preparation system for the preparation of variable length record blocks under program control, and including multi-character position data memory means and corresponding multi-character position program memory means, the improvement comprising:

input means including switch means for providing selected mode control signals each indicating a different mode of operation and control key means for providing selected control signals;

multi-character position command signal storage means, corresponding in position to said memory data means for storing a command signal for modifying system response to predetermined program conditions;

means responsive to said control key means for entering command signals into selected portions of said command signal storage means; and program control means responsive to the status of the system mode control signals, to the status of the system control signals, to the contents of said program memory means and to signals entered into said command signal storage means from said control key means for controlling the processing of information by the system in a predetermined manner dependent upon the status of the system mode control signals, the status of the system control signals, the contents of said program memory means, and the contents of said command signal storage means.

2. The invention as set forth in claim 1 above, wherein said input means further includes data key means, wherein said program memory means is capable of storing a dup program code in selected ones of the program memory character positions to establish dup fields, and wherein said means for entering command signals includes means for enabling operation thereof when one of the following conditions (A) or (B) occurs:

(A) when (A1) the switch means of the input means indicates that a selective verify/release mode of operation has been selected, and (A2) a release key within said control key means of the input means has been depressed at some character position within a data block being processed, and (A3) a character position within a dup field is not being addressed;

(B) when (B1) a data key within said data key means and a reset key within the control key means are simultaneously depressed, and (B2) a character position within a dup field is being addressed, and (B3) a first record is being processed after entering a new mode of operation.

3. The invention as set forth in claim 2 above, further comprising means for clearing command signals stored within said command signal storage means as a first record is processed after entering an enter data mode of operation during which data is entered into the data memory from said data key means of the input means.

4. The invention as set forth in claim 3 above, further comprising memory address means sequentially addressing character positions in said data memory, said program memory means and said command signal storage means, said memory address means being automatically advanced to a next character position without operator control in accordance with a logical equation: $ADVC = (DUP + DPFL) \cdot \overline{FREC} \cdot ED \cdot FLAG + (CREC + RCV) \cdot \overline{WRTE} \cdot COMP \cdot [SKIP + \overline{FREC} \cdot (DUP + DPFL) \cdot \overline{FLAG}] + (RCV + MT + SND) \cdot RCV \cdot (WRTE + COMP) \cdot [SKIP + FREC \cdot (DUP + DPFL) \cdot \overline{FLAG}]$, where ADVC is a signal advancing the memory address means one character position, (DUp + DPFL) is a signal indicating that a character position within a dup field is being addressed, FREC is a signal indicating that a first data block is being processed after entering a new mode of operation, ED is a signal indicating an enter data mode of operation wherein data characters are entered into the data memory from the data key means, FLAG is a signal indicating that a character position within the command signal storage means storing a command signal is being addressed, CREC is a signal indicating a mode of operation wherein data is transferred from a tape unit to the data memory and from the data memory to a data input and output means, RCV is a signal indicating a mode of operation wherein data is transferred into the data memory from a communications link and from the data memory means to a tape unit, WRTE is a signal indicating that the system is in an operating phase wherein data is being transferred out of the data memory means, COMP is a signal commanding that a data character stored in a data block in the data memory means be compared with a corresponding data character in a different block of data, SKIP is a signal indicating that a character position within a skip field is being addressed, FREC is a signal indicating that a first record is being processed after entering a new mode of operation, MT is a signal indicating a merge tape mode of operation wherein data is transferred from a tape unit to the data memory means and from the data memory means to a data input and output means, and SND is a signal indicating a mode of operation wherein data is transferred from a tape unit to the data memory means and from the data memory means to a data input and output means.

5. In an input data preparation system having keyboard means, data input and output means including at least one operator controllable switch, addressable memory means, means for addressing the addressable memory means and control logic means responsive to the keyboard means, information received from data input and output means and addressable memory means for assembling blocks of data in said addressable memory means and transferring data blocks between said memory means and said input and output means, the improvement comprising program means for establishing a dup field at selected addressable positions of a data block stored in said addressable memory means; means responsive to the addressing of a data block position having a dup field established thereat and an operator controllable switch for automatically duplicating data in said memory means when the system is enabled by a selected status of the operator controllable switch; means for selectively identifying addressable data block positions within a dup field as automatic dup positions; and means for providing automatic duplication of a selected portion of data stored at data block positions identified as automatic dup positions without regard to the status of said operator controllable switch.

6. The invention as set forth in claim 5 above, wherein said addressable memory means includes a plurality of addressable character positions, each of which includes storage for a data character, at least one program code, and at least one command signal, said system further including means for storing a command signal in selected character positions of said memory having a dup program code stored therein during a first record, memory address means sequentially addressing said character positions in response to system control signals, and means for providing system control signals to automatically advance said memory address means through character positions storing both a command signal and a dup code without operator control in all records subsequent to said first record while operating in an enter data mode wherein data is entered into the memory from the keyboard and then transferred over the input and output means.

7. In an input data preparation system for assembling blocks of data having a selected standard length for subsequent output in the form of electronic signals, said system including control logic means, data input and output means coupled to the control logic means, keyboard means coupled to the control logic means, memory address means responsive to said control logic means, and addressable memory means responsive to said control logic means and said memory address means, the improvement comprising means responsive to said keyboard means for selecting an arbitrary portion of a data block having a length less than the standard length and means responsive to said keyboard means and to said portion selecting means for transferring only a selected portion of a data block over said input and output means.

8. The invention as set forth in claim 7 above, wherein said memory means includes a plurality of addressable character positions, each of which includes storage for a data character, storage for at least one program code establishing a program field and storage for at least one command signal, said system further including means for entering a release program code into a selected character position to establish said selected standard length, means for entering dup program codes into selected memory positions to cause automatic duplication of data from one data block to the next, means for storing a command signal in an addressed non-dup character position in response to manipulation of the keyboard means and means responsive to the presence of a command signal in a non-dup character position for processing a shortened record by terminating said record at the non-dup character position storing a command signal.

9. In an input data preparation system operating on blocks of data and having a tape unit communicating with an addressable memory, data input and output means including at least one data transfer channel, keyboard means, control logic means responsive to said data input and output means and said keyboard means and coupled to said tape unit, memory address means responsive to said control logic means, and addressable memory means responsive to said control logic means and said memory address means, the improvement comprising means for transferring a block of data to the memory from said tape unit and from the data transfer channel and automatically changing the information content of at least a portion of a block of data as the data is transferred.

10. In an input data preparation system operating on blocks of data and having data input and output means including a data transfer channel, a tape unit, keyboard means, control logic means responsive to said input and output means, said tape unit and said keyboard means, and memory address means responsive to said control logic means, the improvement comprising addressable memory means responsive to said control logic and said memory address means, said addressable memory means including a plurality of addressable character positions, each of which includes storage for a data character, storage for at least one program code establishing a program field and storage for at least one command signal, means for entering a dup program code in at least one selected character position which is addressable by said memory address means to establish a dup field, means for entering command signals into selected dup field character positions which are addressable by said memory address means, and means for inhibiting changes in data information stored in dup field character positions storing a command signal as data enters addressed locations of said addressable memory means from said tape unit or from a data transfer channel in said input and output means.

11. The invention as set forth in claim 10 above, further comprising means for clearing command signals, said clearing means being operable to clear a command signal within a dup field only when the system is not operating (A) in a receive mode wherein data blocks are transferred to said addressable memory means via said data input and output means from a communications link, (B) in a send mode wherein information is transferred from said addressable memory means to a communications link via said data input and output means, or (C) in a merge tape mode wherein data is transferred from said tape unit to said addressable memory means and from said memory means to said data input and output means.

12. An input data preparation system operating on first and subsequent data records and having data input and output means, a tape unit, keyboard means, control logic means responsive to said input and output means, said tape unit and said keyboard means, and memory address means which is advanced or decremented to sequentially address memory character positions in response to said control logic means, the improvement comprising (A) addressable memory means responsive to said control logic and said memory address means, said addressable memory means including a plurality of addressable character positions, each of which includes storage for a data character, storage for at least one program code establishing a program field and storage for at least one command signal, (B) means for entering a command signal into selected ones of addressed character positions, (C) means for entering a dup program code into selected ones of addressed character positions to establish dup fields, (D) means for clearing all command signals during the first record of an enter data mode of operation in which data is entered into the memory means from the keyboard means, (E) means for automatically advancing said memory address means without operator control (E1) when a dup field character position storing a command signal is addressed subsequent to the first record in a keyboard enter mode of operation, (E2) when information is being received over a data transfer channel and a character position is addressed within a skip field or within a dup field not storing a command signal subsequent to a first record, or (E3) when data is being transferred from said addressable memory means to a data transfer channel and a character position is addressed within a skip field or within a dup field not storing a command signal subsequent to a first record, (F) means for terminating a record when the memory address means addresses a character position in a non-dup field storing a command signal in an enter data mode of operation and (G) means for preventing changes in information stored in character positions within a dup field which store a command signal as data is entered into said addressable memory means from a data transfer channel or from said tape unit.

13. In an input data preparation system operating on blocks of data having a predetermined length and having data input and output means, a tape unit, keyboard means, memory address means connected to address an addressable memory means and control logic means responsive to said input and output means, said tape unit and said keyboard means, the improvement comprising (A) addressable memory means responsive to said control logic means and said memory address means, said addressable memory means including a plurality of addressable character positions each of which includes storage for (A1) a data character, (A2) at least one program code establishing a program field and (A3) at least one command signal, (B) means for entering a skip program code into selected ones of the addressable character positions to establish skip fields, and (C) means for adding constant information stored in a skip field established at addressable character positions of the addressable memory beyond the end of a predetermined data block length to data blocks received by said addressable memory from said input and output means.

14. The invention as set forth in claim 13 above, wherein said memory address means is automatically advanced to address a next character position in sequence upon addressing a character position in a skip program field while operating in a central recorder mode wherein information is received in said addressable memory means from the data input and output means and transferred to the tape unit.

15. In an input data preparation system operating on first and subsequent blocks of data and having data input and output means, keyboard means, control logic means responsive to said data input and output means and said keyboard means, and memory address means advanced or decremented to sequentially address memory means in response to said control logic means, the improvement comprising addressable memory means responsive to said control logic means and said memory address means, said addressable memory means including a plurality of addressable character positions, each of which includes storage for a data character, at least one program code and at least one command signal, means responsive to the keyboard means and the control logic means for entering a dup program code into selected ones of the character positions to establish dup fields, means for transferring information between said addressable memory means and said data input and output means under control of the control logic means and means for automatically advancing said memory address means through dup field character positions not storing a command signal without transfer of information when transferring data blocks subsequent to a first data block from said addressable memory means to said data input and output means.

16. In an input data preparation system operating on first and subsequent blocks of data and having data input and output means including a data transfer channel, keyboard means, control logic means responsive to said data input and ouput means and said keyboard means, and memory address means which is advanced or decremented to sequentially address locations of a memory means in response to said control logic, the improvement comprising (A) addressable memory means responsive to said control logic and said memory address means, said addressable memory means including a plurality of character positions which are addressable by the memory address means, each of which includes storage for a data character, at least one program code and at least one command signal, (B) means responsive to the keyboard means and control logic means for entering a dup program code into selected ones of the addressable character positions to establish dup fields at selected character positions, (C) means for storing command signals at selected character positions of said addressable memory means in response to manipulation of said keyboard means, (D) means responsive to the control logic for transferring first and subsequent blocks of data from a data transfer channel to the addressable memory means and (E) means responsive to the establishment of a dup field at an addressed character position and the storage of a command signal at an addressed character position for automatically advancing said memory address means through a dup field character position storing a command signal without change of data stored therein as data blocks subsequent to a first data block are transferred to said addressable memory means from a data transfer channel.

17. In an input data preparation system operating on blocks of data and having data input and output means, a tape unit, keyboard means including means for establishing a central recorder mode of operation and means for establishing a merge tape mode of operation, control logic means responsive to said input and output means, said tape unit, and said keyboard means, and memory address means responsive to said control logic means, the improvement comprising (A) addressable memory means responsive to said control logic means and said memory address means, said addressable memory means including a plurality of addressable character positions, each of which includes storage for a data character and at least one program code establishing a program field, (B) means for entering a skip code into a selected addressed character position of the addressable memory means, and (C) means responsive to the establishment of a central recorder mode of operation for transferring data into the addressable memory means from the data input and outut means and then transferring data from the addressable memory means to the tape unit; means responsive to the establishment of a merge tape mode of operation for transferring data into the addressable memory means from the tape unit and then transferring data from the addressable memory means to the data input and output means; and means responsive to the addressing of a character position storing a skip code while operating in either a central recorder or merge tape mode of operation for terminating the transferring of data from the addressable memory means.

18. The invention as set forth in claim 17 above, wherein said terminating means includes means for simulating a count complete signal indicating the end of a record block to the control logic means.

19. In an input data preparation system operating on blocks of data and having data input and output means, a tape unit, keyboard means, control logic means responsive to said input and output means, said tape unit, and said keyboard means for controlling the processing of data by the system and for sequencing a memory address means through a skip field and a dup field without changing the contents of an addressable memory means when in a mode of operation wherein data is being transferred from either the tape unit or the data input and output means to an addressable memory means, and memory address means responsive to said contol logic means, the improvement comprising (A) addressable memory means responsive to said control logic and said memory address means, said addressable memory means including a plurality of addressable character positions, each of which includes storage for a data character, at least one program code establishing a program field and at least one command signal, (B) means responsive to an enabling signal for comparing data characters received from the tape unit with data characters already stored in the addressable memory means on a character position by character position basis and generating a compare error signal if the compared characters do not match, (C) means for providing an error signal when two compared data characters do not match, (D) means for entering a skip program code into selected ones of character positions to establish skip fields, (E) means for entering a dup program code into different selected ones of character positions to establish dup fields means responsive to program and command signal information stored by the addressable memory means for providing an enabling signal for enabling the means for comparing upon addressing a character position programmed as a skip field or a character position programmed as a dup field that does not store a command signal as data blocks are transferred to said addressable memory means from said tape unit, (F) means for disabling said error signal providing means as blocks of data are transferred from said tape unit to said addressable memory means, and (G) means for transferring a block of data from said addressable memory means to the data input and output means subsequent to the transfer of the block of data from the tape unit to the addressable memory means without a compare error signal being generated.

20. In a data input preparation system for the preparation of variable length record blocks under program control, and including a multi-character position data memory and a corresponding multi-character position program memory, the improvement comprising:

input means including control switch means for providing system mode control signals, and control key means for providing control signals;

multi-character position command signal storage means, corresponding in position to said data memory;

means responsive to said control key means for entering command signals into selected portions of said command signal storage means;

and program control means responsive to the system mode control signals, to said program memory, and to said command signal storage means, for producing a selected program controlled manipulation of a data character in accordance with said mode control signals and said program memory contents at a selected character position when no command signal is present at said character position and selected modified program controlled manipulation of a data character when a command signal is present at said position.

21. The invention as set forth in claim 20 above, further including memory address means for sequentially addressing character positions in the data memory, the program memory, and the command signal storage means, means for entering a dup program code into selected ones of the character positions of the program memory to establish operator selectable dup fields, and means for inhibiting operator nonselection of data information stored in the data memory in character positions within a dup program field wherein a command signal is stored within the command signal storage means.

22. The invention as set forth in claim 21 above, further including means for storing a skip code in selected ones of the character positions of the program memory to establish skip fields, means for comparing portions of a data block stored in the data memory at character positions within a skip field and character positions within a dup field that do not store a command signal in the command signal storage means with data corresponding character positions of another block of data, and means for outputing said other block of data when a match is obtained at all compared character positions.

23. The invention as set forth in claim 22 above, wherein said program control means includes means for causing data blocks having a standard length to be transferred from a data input means to the data memory to a data output means, said system further including means for eliminating skip and dup program codes from all character positions within the standard data block length, means for entering skip code into selected ones of character positions to establish a skip field in at least one character position immediately subsequent to the standard data block length, means for entering a release program code into the program memory at a character position immediately subsequent to the skip field, and means responsive to said skip field and said release code for outputting a lengthened data block containing data stored in character positions within said skip field in addition to data previously present in the standard data block length.

24. The invention as set forth in claim 22 above, further including means for returning said memory address means to a first character position without sequencing through remaining character positions of a block of data when a selective verify/release mode permitting an operator to perform verify and release operations without program control is selected with said switch control means, a non-dup field character position storing a command signal is being addressed, and a release key within said control key means has been depressed at sometime during the processing of the data block.

25. The invention as set forth in claim 24 above, further including means for rapidly passing over character positions within a skip field when inputing or outputing a block of data, means responsive to said control switch means and said memory address means for providing a first record signal throughout the processing of a first data block after entering a different mode of operation, and means for permitting the transfer of data into or out of character positions in the data memory which are programmed as a dup field and which do not store a command signal in the command signal storage means only when a first record signal is present, and for rapidly passing over said character positions without changing information stored thereat when no first record signal is present.

* * * * *

PO-1050
(5/69)

UNITED STATES PATENT OFFICE
CERTIFICATE OF CORRECTION

Patent No. 3,803,555 Dated April 9, 1974

Inventor(s) David W. Mayne and Alan K. Jennings

It is certified that error appears in the above-identified patent and that said Letters Patent are hereby corrected as shown below:

Column 4, line 36, "22" read --32--. Column 5, line 18, the equation should read $$CFLG = FREC \cdot KBGO \cdot \overline{COMP} \cdot ED \qquad (2)$$

Column 5, lines 49 & 50, the equation should read $$ADVC3 = (RCV+MT+SND) \cdot \overline{RCV} \cdot (WRTE+COMP) \cdot [$$

Column 6, line 18, the equation should read $$FLRLC = (\overline{DUP+DPFL}) \cdot ED \cdot FLAG \qquad (7)$$

Column 10, line 23, "(DUp +" read --(DUP + --.
Column 16, line 45, after "data" insert --in--.

Signed and sealed this 1st day of October 1974.

(SEAL)
Attest:

McCOY M. GIBSON JR.
Attesting Officer

C. MARSHALL DANN
Commissioner of Patents